United States Patent
Fushimi et al.

(10) Patent No.: US 9,505,855 B2
(45) Date of Patent: Nov. 29, 2016

(54) CATALYST SYSTEM FOR THE POLYMERIZATION OF OLEFINS

(75) Inventors: Masaki Fushimi, Eschborn (DE); Gerhardus Meier, Frankfurt am Main (DE); Maclovio Herrera Salinas, Frankfurt am Main (DE); Martin Schneider, Hochheim (DE); Giampiero Morini, Padua (IT)

(73) Assignee: Basell Poliolefine Italia S.r.l., Milan (IT)

( * ) Notice: Subject to any disclaimer, the term of this patent is extended or adjusted under 35 U.S.C. 154(b) by 431 days.

(21) Appl. No.: 12/996,683

(22) PCT Filed: Jun. 8, 2009

(86) PCT No.: PCT/EP2009/056995
§ 371 (c)(1),
(2), (4) Date: Dec. 7, 2010

(87) PCT Pub. No.: WO2009/150111
PCT Pub. Date: Dec. 17, 2009

(65) Prior Publication Data
US 2011/0092656 A1  Apr. 21, 2011

Related U.S. Application Data

(60) Provisional application No. 61/132,346, filed on Jun. 18, 2008.

(30) Foreign Application Priority Data

Jun. 13, 2008  (EP) .................................... 08158206

(51) Int. Cl.
| | | |
|---|---|---|
| *B01J 27/32* | (2006.01) | |
| *B01J 31/00* | (2006.01) | |
| *B01J 37/00* | (2006.01) | |
| *C08F 4/02* | (2006.01) | |
| *C08F 4/60* | (2006.01) | |
| *C08F 4/44* | (2006.01) | |
| *C08F 110/02* | (2006.01) | |
| *C08F 10/02* | (2006.01) | |

(52) U.S. Cl.
CPC ..................... *C08F 10/02* (2013.01)

(58) Field of Classification Search
CPC .......... B01J 27/32; B01J 31/00; B01J 37/00; C08F 4/02; C08F 4/60; C08F 4/44; C08F 110/02
USPC .................. 502/132, 128, 224; 526/144, 352
See application file for complete search history.

(56) References Cited

U.S. PATENT DOCUMENTS

| | | |
|---|---|---|
| 4,399,054 A | 8/1983 | Ferraris et al. |
| 4,469,648 A | 9/1984 | Ferraris et al. |
| 4,829,034 A | 5/1989 | Iiskolan et al. |
| 4,971,937 A | 11/1990 | Albizzati et al. |
| 5,095,153 A | 3/1992 | Agnes et al. |
| 5,100,849 A | 3/1992 | Miya et al. |
| 5,221,651 A | 6/1993 | Sacchetti et al. |
| 5,863,995 A | 1/1999 | Daire |
| 5,990,251 A | 11/1999 | Gelus |
| 6,121,393 A * | 9/2000 | Kioka et al. ............... 526/124.3 |
| 6,627,710 B1 * | 9/2003 | Sacchetti ............... C08F 10/00 502/103 |
| 6,660,817 B2 * | 12/2003 | Farrer et al. .................. 526/144 |
| 2002/0061264 A1 | 5/2002 | Govoni et al. |
| 2002/0086794 A1 | 7/2002 | Sacchetti et al. |
| 2003/0027952 A1* | 2/2003 | Farrer et al. .................. 526/110 |
| 2003/0027953 A1 | 2/2003 | Farrer et al. |
| 2004/0072971 A1 | 4/2004 | Govoni et al. |
| 2004/0092691 A1* | 5/2004 | Sacchetti et al. ............. 526/348 |
| 2004/0235645 A1 | 11/2004 | Morini et al. |
| 2005/0216481 A1 | 9/2005 | Crowther et al. |

FOREIGN PATENT DOCUMENTS

| | | | |
|---|---|---|---|
| KR | 200172692 Y1 | 3/2000 | |
| WO | WO-0078820 A1 | 12/2000 | |
| WO | WO 2008077770 A1 * | 7/2008 | ............. C08F 10/02 |

OTHER PUBLICATIONS

Dong, Qi. Fu, Zhisheng. Xu, Junting. Fan, Zhiqiang. Strong influences of cocatalyst on ethylene/propylene copolymerization with a MgCl2/SiO2/TiCl4/diester type Ziegler-Natta catalyst. European Polymer Journal. vol. 43. 2007. pp. 3442-3451.*

Dong et al. Strong influences of cocatalyst on ethylene/propylene copolymerization with a MgCl2/SiO2/TiCl4/diester type Ziegler-Natta catalyst, European Polymer Journal, vol. 43, 2007, pp. 3442-3451.*

Luo et al. Studies on highly efficient promoters for titanium-based Ziegler-Natta catalyst for ethylene polymerization. Applied Catalysis A: General 203 (2000). pp. 269-273.*

* cited by examiner

*Primary Examiner* — Alexa Neckel
*Assistant Examiner* — Elizabeth Eng

(57) ABSTRACT

The present invention relates to catalysts systems for the polymerization of olefins $CH_2=CHR$, wherein R is an alkyl, cycloalkyl or aryl radical having 1-12 carbon atoms, comprising (A) a solid catalyst component comprising Ti, Mg, and halogen (B) an aluminum alkyl compound and (C) a mono or dihalogenated hydrocarbon compound. Said catalyst systems have improved polymerization activity.

6 Claims, No Drawings

CATALYST SYSTEM FOR THE POLYMERIZATION OF OLEFINS

This application is the U.S. national phase of International Application PCT/EP2009/056995, filed Jun. 8, 2009, claiming priority to European Application 08158206.6 filed Jun. 13, 2008 and the benefit under 35 U.S.C. 119(e) of U.S. Provisional Application No. 61/132,346, filed Jun. 18, 2008; the disclosures of International Application PCT/EP2009/056995, European Application 08158206.6 and U.S. Provisional Application No. 61/132,346, each as filed, are incorporated herein by reference.

The present invention relates to a catalyst for the polymerization of olefins, in particular ethylene and its mixtures with olefins $CH_2=CHR$, wherein R is an alkyl, cycloalkyl or aryl radical having 1-12 carbon atoms, comprising a solid catalyst component comprising Ti, Mg, halogen and having specific physical features expressed by a certain range of porosity, an aluminum alkyl compound and certain specific halogenated alkyl compounds.

The polymerization activity is a very important factor in any polymerization process. For a given catalyst system, it may depends on the polymerization conditions, such as temperature, pressure and molecular weight regulator concentration. However, once fixed the polymerization conditions the activity depends strictly on the catalyst system and when the activity is not satisfactory the amount of catalyst fed to the reactor must be increased or its residence time made longer. Both solutions penalize the plant operability as the increase of catalyst fed means increase of the cost per unity of polymer produced, while the increase of the residence time means a lower productivity of the plant.

In view of this importance, the need of increase the catalyst activity is always felt. The Ziegler-Natta catalyst are generally obtained by reacting an aluminum alkyl compound with a solid catalyst component comprising a magnesium halide and a titanium compound containing at least a Ti-halogen bond. As the catalyst determines both the activity and the polymer properties, once a catalyst system has been chosen for industrial production it is changed for a different one having higher activity only if the new one maintains basically unaltered the polymer properties. This is the reason why it is felt the need of modifying the polymerization activity of a certain catalyst system without changing its capability to produce a polymer with certain properties.

Particularly, in the ethylene polymerization processes, where the catalyst system, differently from polypropylene catalyst, usually does not comprise external donor compounds for increasing the stereospecificity, the attempt for increasing the activity, commonly involves the use of halogenated hydrocarbon compounds as activity enhancer. Such a use is disclosed for example in U.S. Pat. No. 5,863,995, and EP 703246 A1. WO03/010211 and WO04/03783 specifically relate to gas-phase polymerization processes employing a Ziegler-Natta catalyst component, an aluminum alkyl and a saturated halogenated hydrocarbon in certain specific ratios. According to the description no criticality is associated to the Ziegler-Natta catalyst while the halogenated hydrocarbon can be selected among a very broad list. In the polymerization examples of WO03/010211 chloroform is used and the results are shown in tables 1-3. For all the tests of examples 5-21 which include the use of other polyhalogenated compounds, no information on the results is given, as confirmed by the wording at page 18, lines 9-10 stating that increased in activity is merely "expected".

Another important feature relating to the gas-phase polymerization process is the capability of the catalyst of maintaining a good morphological stability, i.e. of being able to withstand to the polymerization conditions and not fragmented in too small particles which can cause the formation of polymer particles that can cause plant operating problems. Such a tendency to break is particularly seen when the ethylene polymer to be produced has a relatively low molecular weight expressed by high values of melt flow index. Polymers of such type are commonly produced in one of the two or more cascade process for the preparation of broad molecular weight distribution ethylene polymer. In order to produce such a low molecular weight polymer, a higher concentration of molecular weight regulator is used (commonly hydrogen) which has a depressing effect on the catalyst activity. Under these conditions, the enhancing polymerization agent which is used should interact with the other catalyst components in such a way that the resulting catalyst system is capable to produce a polymer in higher yields but having the same, or increased, bulk density with respect to that obtainable in the absence of the enhancing polymerization activity agent.

The applicant has therefore surprisingly found that the combination of a specific type of catalyst and a specific type of activity enhancer, led to an improved gas-phase ethylene polymerization process.

It is therefore an object of the present invention a catalyst system particularly suitable for the gas-phase process for the polymerization of olefins, comprising (A) a solid catalyst component comprising Ti, Mg, halogen, and having a porosity ($P_F$), measured by the mercury method and due to pores with radius equal to or lower than 1 μm, of at least 0.3 cm$^3$/g, (B) an aluminum alkyl compound and (C) a mono or dihalogenated hydrocarbon.

Preferably, the halogenated hydrocarbon is chosen among monohalogenated hydrocarbons. More preferably, it is chosen among monohalogenated hydrocarbons in which the halogen is linked to a secondary carbon atom. The halogen is preferably chosen among chloride and bromide.

Non limiting exemplary compounds (C) are propylchloride, i-propylchloride, butylchloride, s-butylchloride, t-butyl chloride 2-chlorobutane, cyclopentylchloride, cyclohexylchloride, 1,2-dichloroethane, 1,6-dichlorohexane, propylbromide, and i-propylbromide, butylbromide, s-butylbromide, t-butylbromide, i-butylbromide pentylbromide, t-pentylbromide. Among them, particularly preferred are i-propylchloride, 2-chlorobutane, cyclopentylchloride and 2-bromopropane.

The activity enhancer is used in amounts such as to have the (B)/(C) molar ratio of higher than 3 and preferably in the range 5-20 and more preferably in the range 5-13.

Preferably, the components (A) and (C) are used in such amounts to give a molar ratio between (C) and the Ti atoms contained in (A) of higher than 2.5, preferably higher than 3 and more preferably higher than 3.5. In the gas phase polymerization a particularly preferred range is from 3 to 10 and more preferably from higher than 3.5 to 7.

The aluminum alkyl can be preferably selected from the trialkyl aluminum compounds such as for example trimethylaluminum (TMA), triethylaluminum (TEAL), triisobutylaluminum (TIBA)), tri-n-butylaluminum, tri-n-hexylaluminum, tri-n-octylaluminum. Also alkylaluminum halides and in particular alkylaluminum chlorides such as diethylaluminum chloride (DEAC), diisobutylaluminum chloride, Al-sesquichloride and dimethylaluminum chloride (DMAC) can be used. It is also possible to use, and in certain cases preferred, mixtures of trialkylaluminum's with alkylaluminum halides. According to the present invention is particularly preferred the use of mixtures between TEAL and TIBA in molar ratios ranging from 0.1 to 10 preferably from 0.5 to 2.5. When mixtures of aluminum alkyls are used the total molar amount of Al is used to determine the ratio (B)/(C).

Preferably the catalyst component (A) has a porosity $P_F$ determined with the mercury method higher than 0.40 cm$^3$/g and more preferably higher than 0.50 cm$^3$/g usually in the range 0.50-0.80 cm$^3$/g. The total porosity $P_T$ can be in the range of 0.50-1.50 cm$^3$/g, particularly in the range of from 0.60 and 1.20 cm$^3$/g.

The surface area measured by the BET method is preferably lower than 80 and in particular comprised between 10 and 70 m$^2$/g. The porosity measured by the BET method is generally comprised between 0.10 and 0.50, preferably from 0.10 to 0.40 cm$^3$/g.

The amount of Ti is typically higher than 1.5% preferably higher than 3% and more preferably equal to, or higher than, 3.2% wt. Most preferably it ranges from 3.5 to 8% wt.

In a preferred aspect the catalyst component of the invention comprises a Ti compound having at least one Ti-halogen bond supported on a magnesium chloride which is preferably magnesium dichloride and more preferably magnesium dichloride in active form. In the context of the present application the term magnesium chloride means magnesium compounds having at least one magnesium chloride bond. As mentioned before, the catalyst component may also contain groups different from halogen, in any case in amounts lower than 0.5 mole for each mole of titanium and preferably lower than 0.3.

In the catalyst component of the invention the average pore radius value, for porosity due to pores up to 1 μm, is in the range from 600 to 1200 Å.

The particles of solid component (A) have substantially spherical morphology and average diameter comprised between 35 and 150 μm, preferably from 40 to 130 μm and more preferably from 50 to 130 μm. As particles having substantially spherical morphology, those are meant wherein the ratio between the greater axis and the smaller axis is equal to or lower than 1.5 and preferably lower than 1.3.

The magnesium dichloride in the active form is characterized by X-ray spectra in which the most intense diffraction line which appears in the spectrum of the non active chloride (lattice distanced of 2.56 Å) is diminished in intensity and is broadened to such an extent that it becomes totally or partially merged with the reflection line falling at lattice distance (d) of 2.95 Å. When the merging is complete the single broad peak generated has the maximum of intensity which is shifted towards angles lower than those of the most intense line.

A method suitable for the preparation of spherical components mentioned above comprises a first step (a) in which a compound MgCl$_2$.m(R$^{III}$OH)tH$_2$O, wherein 0.3≤m≤1.7, t is from 0.01 to 0.6 and R$^{III}$ is an alkyl, cycloalkyl or aryl radical having 1-12 carbon atoms is reacted with the said titanium compound of the formula Ti(OR$^{II}$)$_n$X$_{y-n}$, in which n, y, X and R$^{II}$ have the same meaning defined above.

In this case MgCl$_2$.mR$^{III}$OH represents a precursor of Mg dihalide. These kind of compounds can generally be obtained by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Representative methods for the preparation of these spherical adducts are reported for example in U.S. Pat. No. 4,469,648, U.S. Pat. No. 4,399,054, and WO98/44009. Another useable method for the spherulization is the spray cooling described for example in U.S. Pat. Nos. 5,100,849 and 4,829,034. Adducts having the desired final alcohol content can be obtained by directly using the selected amount of alcohol directly during the adduct preparation. However, if adducts with increased porosity are to be obtained it is convenient to first prepare adducts with more than 1.7 moles of alcohol per mole of MgCl$_2$ and then subjecting them to a thermal and/or chemical dealcoholation process. The thermal dealcoholation process is carried out in nitrogen flow at temperatures comprised between 50 and 150° C. until the alcohol content is reduced to the value ranging from 0.3 to 1.7. A process of this type is described in EP 395083.

Generally these dealcoholated adducts are also characterized by a porosity (measured by mercury method) due to pores with radius due to pores with radius up to 0.1 μm ranging from 0.15 to 2.5 cm$^3$/g preferably from 0.25 to 1.5 cm$^3$/g.

In the reaction of step (a) the molar ratio Ti/Mg is stoichiometric or higher; preferably this ratio in higher than 3. Still more preferably a large excess of titanium compound is used. Preferred titanium compounds are titanium tetrahalides, in particular TiCl$_4$ The reaction with the Ti compound can be carried out by suspending the adduct in cold TiCl$_4$ (generally 0° C.); the mixture is heated up to 80-140° C. and kept at this temperature for 0.5-8 preferably from 0.5 to 3 hours. The excess of titanium compound can be separated at high temperatures by filtration or sedimentation and siphoning.

Although it is not strictly necessary the solid catalyst component (A) can also comprise an electron donor compound (internal donor), selected for example among ethers, esters, amines and ketones. In particular, the internal electron donor compound can be selected from the alkyl, cycloalkyl and aryl ether and esters of polycarboxylic acids, such as for example esters of acetic, phthalic, benzoic and succinic acid, in particular n-butylphthalate, diisobutylphthalate, di-n-octylphthalate, ethyl acetate, ethyl benzoate.

Other electron donor compounds advantageously used are the ethers like tetrahydrofurane and the 1,3-diethers disclosed particularly in EP 361494, EP361493, and EP728769.

The above-mentioned components (A)-(C) can be fed separately into the reactor where, under the polymerization conditions can exploit their activity. It may be advantageous to carry out a pre-contact of the above components, optionally in the presence of small amounts of olefins, for a period of time ranging from 0.1 to 120 minutes preferably in the range from 1 to 60 minutes. The pre-contact can be carried out in a liquid diluent at a temperature ranging from 0 to 90° C. preferably in the range of 20 to 70° C.

The so formed catalyst system can be used directly in the main polymerization process or alternatively, it can be pre-polymerized beforehand. A pre-polymerization step is usually preferred when the main polymerization process is carried out in the gas phase. The prepolymerization can be carried out with any of the olefins CH$_2$=CHR, where R is H or a C1-C10 hydrocarbon group. In particular, it is especially preferred to pre-polymerize ethylene, propylene or mixtures thereof with one or more α-olefins, said mixtures containing up to 20% in moles of α-olefin, forming amounts of polymer from about 0.1 g per gram of solid component up to about 1000 g per gram of solid catalyst component. The pre-polymerization step can be carried out at temperatures from 0 to 80° C., preferably from 5 to 70° C., in the liquid or gas phase. The pre-polymerization step can be performed in-line as a part of a continuous polymerization process or separately in a batch process. The batch pre-polymerization of the catalyst of the invention with propylene in order to produce an amount of polymer ranging from 0.5 to 20 g per gram of catalyst component is particularly preferred. The pre-polymerized catalyst component can also be subject to a further treatment with a titanium compound before being used in the main polymerization step. In this case the use of $TiCl_4$ is particularly preferred. The reaction with the Ti compound can be carried out by suspending the prepolymerized catalyst component in the liquid Ti compound optionally in mixture with a liquid diluent; the mixture is heated to 60-120° C. and kept at this temperature for 0.5-2 hours.

The gas-phase process can be carried out with the catalyst of the invention in any type of polymerization reactor such as agitated or fluidized bed gas-phase reactors. Moreover, it can be also carried out in gas-phase reactors having at least two interconnected polymerization zones described in EP-A-782587 and EP-A-1012195 or a combination of them with a stirred or fluidized bed reactor.

The process of the invention can also be performed in two or more reactors working under different conditions and optionally by recycling, at least partially, the polymer which is formed in the second reactor to the first reactor. Usually, the two or more reactors work with different concentrations of molecular weight regulator or at different polymerization temperatures or both. Preferably, the polymerization is carried out in two or more steps operating with different concentrations of molecular weight regulator.

As already mentioned, the catalysts of the present invention show a high polymerization activity in the (co)polymerization of ethylene.

In addition, to the ethylene homo and copolymers mentioned above the catalysts of the present invention are also suitable for preparing very-low-density and ultra-low-density polyethylenes (VLDPE and ULDPE, having a density lower than 0.920 g/cm$^3$, to 0.880 g/cm$^3$) consisting of copolymers of ethylene with one or more alpha-olefins having from 3 to 12 carbon atoms, having a mole content of units derived from ethylene of higher than 80%; elastomeric copolymers of ethylene and propylene and elastomeric terpolymers of ethylene and propylene with smaller proportions of a diene having a content by weight of units derived from ethylene of between about 30 and 70%.

The following examples are given in order to further describe the present invention in a non-limiting manner.
Characterization The properties are determined according to the following methods:
Porosity and surface area with nitrogen: are determined according to the B.E.T. method (apparatus used SORPTOMATIC 1900 by Carlo Erba).
Porosity and Surface Area with Mercury:

The measure is carried out using a "Porosimeter 2000 series" by Carlo Erba.

The porosity is determined by absorption of mercury under pressure. For this determination it is used a calibrated dilatometer (diameter 3 mm) CD$_3$ (Carlo Erba) connected to a reservoir of mercury and to a high-vacuum pump (1·10$^{-2}$ mbar). A weighed amount of sample is placed in the dilatometer. The apparatus is then placed under high vacuum (<0.1 mm Hg) and is maintained in these conditions for 20 minutes. The dilatometer is then connected to the mercury reservoir and the mercury is allowed to flow slowly into it until it reaches the level marked on the dilatometer at a height of 10 cm. The valve that connects the dilatometer to the vacuum pump is closed and then the mercury pressure is gradually increased with nitrogen up to 140 kg/cm$^2$. Under the effect of the pressure, the mercury enters the pores and the level goes down according to the porosity of the material.

The porosity (cm$^3$/g), both total and that due to pores up to 1 μm, the pore distribution curve, and the average pore size are directly calculated from the integral pore distribution curve which is function of the volume reduction of the mercury and applied pressure values (all these data are provided and elaborated by the porosimeter associated computer which is equipped with a "MILESTONE 200/2.04" program by C. Erba.
MIE flow index: ASTM-D 1238 condition E
MIF flow index: ASTM-D 1238 condition F
MIP flow index: ASTM D 1238 condition P
Bulk density: DIN-53194
Determination of Mg, Ti$_{tot}$) and Al: has been carried out via inductively coupled plasma emission spectroscopy (ICP) on a "I.C.P SPECTROMETER ARL Accuris".

The sample was prepared by analytically weighting, in a "fluxy" platinum crucible", 0.1+03 g of catalyst and 3 gr of lithium metaborate/tetraborate I/I mixture. The crucible is placed on a weak Bunsen flame for the burning step and then after addition of some drops of KI solution inserted in a special apparatus "Claisse Fluxy" for the complete burning. The residue is collected with a 5% v/v HNO$_3$ solution and then analyzed via ICP at the following wavelength: Magnesium, 279.08 nm; Titanium, 368.52 nm; Aluminum, 394.40 nm.
Determination of Cl: has been carried out via potentiometric tritration.
Determination of OR groups: via Gas-Chromatography analysis
General Procedure for the HDPE Polymerization Test Into a 1.5 liters stainless steel autoclave, degassed under N$_2$ stream at 70° C., 500 ml of anhydrous hexane, the catalyst component, 1.8 mol of triethylaluminum (TEA) and the reported amount of halogenated hydrocarbon compound (C) were introduced. The mixture was stirred, heated to 75° C. and thereafter 3 bar of H$_2$ and 7 bar of ethylene were fed. The polymerization lasted 2 hours. Ethylene was fed to keep the pressure constant. At the end, the reactor was depressurized and the polymer thus recovered was dried under vacuum at 70° C.

EXAMPLES 1-11 AND COMPARISON EXAMPLE 1

Preparation of the Solid Component (A)

A magnesium chloride and alcohol adduct containing about 3 mols of alcohol was prepared following the method described in example 2 of U.S. Pat. No. 4,399,054, but working at 2000 RPM instead of 10000 RPM. The adduct were subject to a thermal treatment, under nitrogen stream, over a temperature range of 50-150° C. until a weight content of 25% of alcohol was reached.

Into a 2 L four-necked round flask, purged with nitrogen, 1 L of TiCl$_4$ was introduced at 0° C. Then, at the same temperature, 70 g of a spherical MgCl$_2$/EtOH adduct containing 25% wt of ethanol and prepared as described above were added under stirring. The temperature was raised to 140° C. in 2 h and maintained for 60 min. Then, the stirring was discontinued, the solid product was allowed to settle and the supernatant liquid was siphoned off. The solid residue was then washed once with heptane at 80° C. and five times with hexane at 25° C. and dried under vacuum at 30° C. and analyzed.

The so obtained solid catalyst component (A) was used in the ethylene polymerization according to the general procedure using the type and amount of compound (C) reported in table 1 together with the polymerization results.

EXAMPLES 12-20 AND COMPARATIVE EXAMPLE 2

The catalyst component (A) prepared as described in example 1 was used in the polymerization of ethylene which was carried out according to the general polymerization procedure with the difference that the ethylene pressure was 3 bar, the hydrogen pressure was 9 bar. The other specific conditions and results are reported in table 2.

EXAMPLES 21-23 AND COMPARATIVE EXAMPLE 3

Into a 260 cm³ glass reactor provided with stirrer, 351.5 cm³ of hexane at 20° C. and whilst stirring 7 g of the catalyst component prepared as described in example 1 were introduced at 20° C. Keeping constant the internal temperature, 5.6 cm³ of tri-n-octylaluminum (TNOA) in hexane (about 370 WI) were slowly introduced into the reactor and the temperature was brought to 10° C. After 10 minutes stirring, 10 g of propylene were carefully introduced into the reactor at the same temperature during a time of 4 hours. The consumption of propylene in the reactor was monitored and the polymerization was discontinued when a theoretical conversion of 1 g of polymer per g of catalyst was deemed to be reached. Then, the whole content was filtered and washed three times with hexane at a temperature of 20° C. (50 g/l). After drying the resulting pre-polymerized catalyst (A) was analyzed and found to contain 1.1 g of polypropylene per g of catalyst and 2.6 wt % of titanium atom.

The so obtained pre-polymerized solid catalyst component (A) was employed in the ethylene polymerization according to the following procedure. The other specific conditions and results are reported in table 3.

A stainless steel fluidized bed reactor with an internal diameter of 200 mm equipped with a gas circulation system, cyclone, heat exchanger, temperature and pressure control systems, feeding lines for ethylene, propane and hydrogen were used. The gas phase reactor was purified by flushing with nitrogen at 120° C. for 12 hours. Then the reactor was pressurized with propane and heated up till 75° C. Then the following gas composition was set: 13.6 bar propane, 1.9 bar ethylene, 9.5 bar hydrogen. Then a prepolymerized catalyst (1 g/hr), a listed amount of TIBA/TEA (a mixture of 2:1 molar ratio) per catalyst in table 3 and a listed amount of CPCL per Ti atom in table 3 were dosed in a continuous way with propane as diluent via a stirred precontacting vessel to the reactor. The residence time in the precontacting vessel was 60 minutes. When reaching steady state in the reactor, the reactor was discharging 5 kg/h of polyethylene. The hold-up in the reactor was controlled to be 15 kg, giving a residence of 3 hours in the reactor. The discharged polymer is dried in a continuous way by flushing with nitrogen. The results are reported in Table 3.

TABLE 1

| EX. | Comp. C | AlR₃/Hal (mol ratio) | Activity (g/g) | BD (g/L) | MIE |
|---|---|---|---|---|---|
| 1 | Propylchloride | 10 | 20400 | 221 | 0.74 |
| 2 | i-propylchloride | " | 32000 | 190 | 0.50 |
| 3 | Butylchloride | " | 17200 | 199 | 0.56 |
| 4 | s-butylchloride | " | 18000 | 205 | 0.79 |
| 5 | 2-chlorobutane | " | 30000 | 215 | 0.91 |
| 6 | Cyclopentylchloride | " | 30400 | 239 | 0.46 |
| 7 | Cyclohexylchloride | " | 21900 | 202 | 0.69 |
| 8 | 1,2-dichloroethane | " | 19100 | 218 | 0.59 |
| 9 | 1,6-dichlorohexane | " | 22400 | 241 | 0.94 |
| 10 | Bromopropane | " | 24400 | 225 | 0.74 |
| 11 | i-propylbromide | " | 30200 | 208 | 0.86 |
| Comp. 1 | — | " | 14400 | 231 | 0.55 |

TABLE 2

| EX. | Comp. (C) | AlR₃/(C) (mol ratio) | (C)/Ti | Activity (g/g) | BD (g/L) | MIE |
|---|---|---|---|---|---|---|
| 12 | cyclopentylchloride | 20 | 33 | 5400 | 280 | 51.8 |
| 13 | " | 10 | 66 | 7100 | 260 | 36.6 |
| 14 | " | 7.5 | 99 | 7640 | 252 | 39.7 |
| 15 | " | 5 | 132 | 5600 | 258 | 37.9 |
| 16 | i-propylchloride | 10 | 66 | 5740 | 276 | 42.2 |
| 17 | s-butylchloride | 10 | 66 | 5900 | 272 | 39.9 |
| 18 | t-butylchloride | 10 | 66 | 5650 | 244 | 7.7 |
| 19 | cyclohexylchloride | 10 | 66 | 5200 | 274 | 35 |
| 20 | 1,2-dichloroethane | 10 | 66 | 6900 | 259 | 40.4 |
| Comp. 2 | — | | | 3170 | 239 | 36.2 |

TABLE 3

| EX. | Comp. (C) | AlR₃/(C) (mol ratio) | Al/Ctz g/g | (C)/Ti | Activity (g/g) | BD (g/L) | MIE |
|---|---|---|---|---|---|---|---|
| 21 | CpCl | 7.3 | 2.5 | 3.2 | 4400 | 458 | 206 |
| 22 | " | 7.3 | 2 | 3.0 | 4450 | 459 | 203 |
| 23 | " | 6.7 | 2.5 | 4.4 | 5650 | 474 | 192 |
| Comp. 3 | — | — | 2 | | 2300 | 387 | 241 |

What is claimed is:

1. A catalyst system for the polymerization of olefins in a gas-phase process, comprising:
    (A) a solid catalyst component comprising Ti, Mg, halogen, and having a porosity ($P_F$), measured by the mercury method and due to pores with radius equal to or lower than 1 µm, of at least 0.3 cm³/g;
    (B) at least one alkyl aluminum compound; and
    (C) a halogenated hydrocarbon selected from the group consisting of cyclopentylchloride and cyclohexylchloride,
    wherein the (B)/(C) molar ratio is 5 to 20, and a molar ratio between (C) and the Ti atoms contained in (A) is higher than 3.

2. The catalyst according to claim 1 in which the catalyst component (A) has a porosity $P_F$ determined with the mercury method of higher than 0.40 cm³/g.

3. The catalyst according to claim 1 in which the particles of the catalyst component (A) have an average diameter comprised between 40 and 130 µm.

4. A process for the gas-phase (co)polymerization of ethylene comprising contacting ethylene with the catalyst system according to claim 1.

5. The catalyst system of claim 1, wherein the solid catalyst component has a porosity ($P_F$), measured by the mercury method and due to pores with radius equal to or lower than 1 μm, of at least 0.5 cm$^3$/g.

6. The catalyst system of claim 1, wherein the at least one alkyl aluminum compound comprises a mixture of triethylaluminum and triisobutylaluminum.

\* \* \* \* \*